(12) United States Patent
Khandelwal et al.

(10) Patent No.: US 10,715,731 B1
(45) Date of Patent: Jul. 14, 2020

(54) IMAGE STABILIZATION IN ZOOM MODE

(71) Applicant: QUALCOMM Incorporated, San Diego, CA (US)

(72) Inventors: Rahul Khandelwal, Delhi (IN); Gazal Mittal, New Delhi (IN); Lakshmi Kantha Reddy Ponnatota, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/227,499

(22) Filed: Dec. 20, 2018

(51) Int. Cl.
*H04N 5/232* (2006.01)

(52) U.S. Cl.
CPC ..... *H04N 5/23287* (2013.01); *H04N 5/23212* (2013.01); *H04N 5/23254* (2013.01); *H04N 5/23296* (2013.01)

(58) Field of Classification Search
CPC ........... H04N 5/23287; H04N 5/23212; H04N 5/23254; H04N 5/23296
See application file for complete search history.

(56) References Cited

U.S. PATENT DOCUMENTS

| | | | |
|---|---|---|---|
| 6,989,865 B1 * | 1/2006 | Ohta | H04N 5/232 348/347 |
| 2012/0050580 A1 * | 3/2012 | Iwasaki | H04N 5/23212 348/240.99 |
| 2012/0120216 A1 * | 5/2012 | Morita | G02B 23/2469 348/65 |
| 2015/0002703 A1 * | 1/2015 | Curti | G02B 13/009 348/240.99 |

* cited by examiner

*Primary Examiner* — Gevell V Selby
(74) *Attorney, Agent, or Firm* — Holland & Hart LLP

(57) ABSTRACT

Methods, systems, and devices for image processing are described. The method includes detecting blurring in one or more images from a stream of images captured by a camera based on monitoring the stream of images, identifying a level of zoom based on detecting the blurring, selecting an autofocus configuration from a set of autofocus configurations based on the identified level of zoom, and performing an autofocus operation using the selected autofocus configuration.

17 Claims, 11 Drawing Sheets

IMAGE STABILIZATION IN ZOOM MODE

BACKGROUND

The following relates generally to image processing, and more specifically to image stabilization.

Image stabilization may refer to a field of image processing for detecting jitter and blurring and using motors in a camera to counteract the detected jitter and blurring. Image stabilization may be configured to compensate for pan, tilt, and/or rotational movements of the imaging device. With still cameras, camera shake is a particular problem at slow shutter speeds or with long focal length (e.g., telephoto or zoom lenses). With video cameras, camera shake causes visible frame-to-frame jitter in the recorded video.

There currently exist a variety of portable computing devices such as portable wireless telephones, personal digital assistants (PDAs), laptop computers, tablet personal computers, and the like, that may include digital imaging sensors for taking photos (and video) as well as components for communicating voice and data packets over wired or wireless networks (e.g., for downloading videos and images). Such devices may benefit from improved image stabilization techniques.

SUMMARY

The described techniques relate to improved methods, systems, devices, and apparatuses that support image stabilization in a zoom mode. Generally, the described techniques provide for detecting blurring in images captured by a camera and making adjustments in the camera to remove the blurring where the level of the adjustments made is determined by a level of zoom on the camera. In line with the present disclosure, enabling a camera to make finer autofocus adjustments when zoom is activated enables the camera to remove blurring to a greater degree compared to a conventional camera with a single, static autofocus configuration.

A method of image processing at a device is described. The method may include detecting blurring in one or more images from a stream of images captured by a camera based on monitoring the stream of images, identifying a level of zoom based on detecting the blurring, selecting an autofocus configuration from a set of autofocus configurations based on the identified level of zoom, and performing an autofocus operation using the selected autofocus configuration.

An apparatus for image processing at a device is described. The apparatus may include a processor, memory in electronic communication with the processor, and instructions stored in the memory. The instructions may be executable by the processor to cause the apparatus to detect blurring in one or more images from a stream of images captured by a camera based on monitoring the stream of images, identify a level of zoom based on detecting the blurring, select an autofocus configuration from a set of autofocus configurations based on the identified level of zoom, and perform an autofocus operation using the selected autofocus configuration.

Another apparatus for image processing at a device is described. The apparatus may include means for detecting blurring in one or more images from a stream of images captured by a camera based on monitoring the stream of images, identifying a level of zoom based on detecting the blurring, selecting an autofocus configuration from a set of autofocus configurations based on the identified level of zoom, and performing an autofocus operation using the selected autofocus configuration.

A non-transitory computer-readable medium storing code for image processing at a device is described. The code may include instructions executable by a processor to detect blurring in one or more images from a stream of images captured by a camera based on monitoring the stream of images, identify a level of zoom based on detecting the blurring, select an autofocus configuration from a set of autofocus configurations based on the identified level of zoom, and perform an autofocus operation using the selected autofocus configuration.

Some examples of the method, apparatuses, and non-transitory computer-readable medium described herein may further include operations, features, means, or instructions for generating a non-zoom autofocus configuration, a first zoom autofocus configuration, and a second zoom autofocus configuration, the set of autofocus configurations including at least one of the non-zoom autofocus configuration, the first zoom autofocus configuration, or the second zoom autofocus configuration. In some cases, selecting the autofocus configuration includes selecting one of the set of autofocus configurations based on the identified level of zoom satisfying a first zoom threshold, or satisfying a second zoom threshold greater than the first zoon threshold, or based on satisfying both.

In some examples of the method, apparatuses, and non-transitory computer-readable medium described herein, selecting the autofocus configuration further may include operations, features, means, or instructions for selecting the non-zoom autofocus configuration when the identified level of zoom fails to satisfy the first zoom threshold.

In some examples of the method, apparatuses, and non-transitory computer-readable medium described herein, selecting the autofocus configuration further may include operations, features, means, or instructions for selecting the first zoom autofocus configuration when the identified level of zoom satisfies the first zoom threshold and fails to satisfy the second zoom threshold.

In some examples of the method, apparatuses, and non-transitory computer-readable medium described herein, selecting the autofocus configuration further may include operations, features, means, or instructions for selecting the second zoom autofocus configuration when the identified level of zoom satisfies both the first zoom threshold and the second zoom threshold.

Some examples of the method, apparatuses, and non-transitory computer-readable medium described herein may further include operations, features, means, or instructions for determining whether a detectable shaking of the camera satisfies a jitter threshold.

Some examples of the method, apparatuses, and non-transitory computer-readable medium described herein may further include operations, features, means, or instructions for compensating for jitter by adjusting a position of one or more components of the camera at a rate of movement determined by the selected autoconfiguration when the detectable shaking exceeds the jitter threshold.

In some examples of the method, apparatuses, and non-transitory computer-readable medium described herein, performing the autofocus operation may include operations, features, means, or instructions for mechanically adjusting one or more autofocus motors.

Some examples of the method, apparatuses, and non-transitory computer-readable medium described herein may further include operations, features, means, or instructions for adjusting at least one lens motor, or at least one image sensor motor, or both.

Some examples of the method, apparatuses, and non-transitory computer-readable medium described herein may further include operations, features, means, or instructions for tuning the one or more autofocus motors based on determining a rate of movement by the one or more autofocus motors relative to incremented levels of zoom varying from no zoom to maximum zoom.

In some examples of the method, apparatuses, and non-transitory computer-readable medium described herein, identifying the level of zoom further may include operations, features, means, or instructions for identifying the level of zoom by a percentage value, where the percentage value at 100% indicates a maximum level of zoom and the percentage value at 0% indicates a minimum level of zoom.

DETAILED DESCRIPTION

Figure 1:
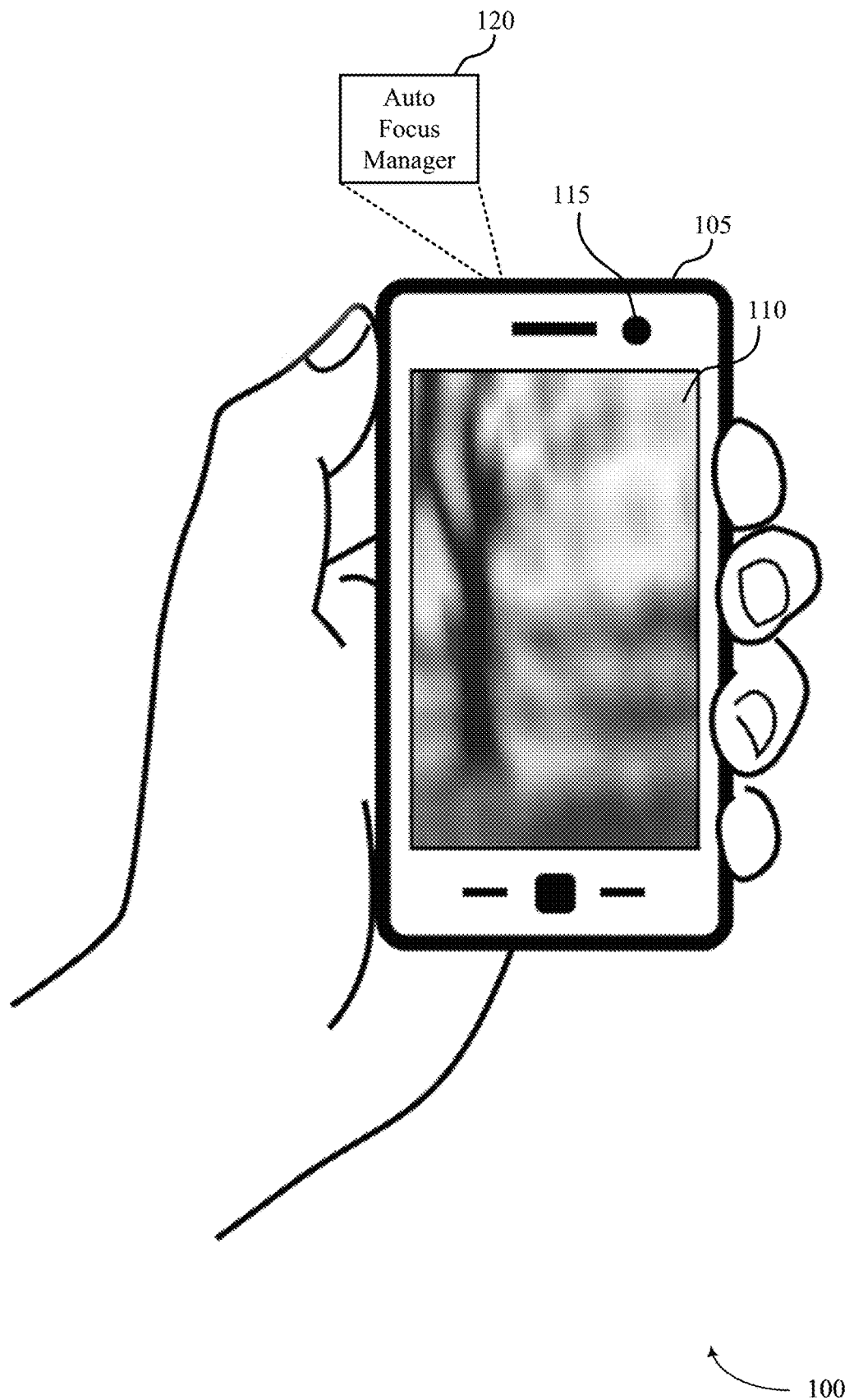
FIG. 1 illustrates an example of a system for image processing that supports image stabilization in zoom mode in accordance with aspects of the present disclosure.

Computer devices may include a camera that includes autofocus (AF) and zoom capabilities. In some cases, AF may perform well in normal (e.g., non-zoom) scenarios. However, in zoomed-in operations (e.g., image preview and/or image capture of still images or video images while zoom is enabled), AF and/or optical image stabilization may perform poorly (e.g., due to the lack of a feedback mechanisms and calibrations for AF and image stabilization when the camera is operated in zoom mode). In other systems, the same single configuration is used for AF and/or image-stabilizing sensor movements for both the non-zoom and zoom operations. However, in the other systems the configuration of the sensor movements is calibrated for non-zoom operation, but is not calibrated for zoom operation. As a result, the undesired effects of image blur and shaking the camera—which are exaggerated when operating in zoom mode—are further exaggerated by the mis-calibrated AF and image stabilization implemented in zoom mode, which results in more blur than is present when image stabilization is not activated. This reduces the efficacy of the device and degrades user experience, among other problems.

The present techniques relate to dynamic AF in different modes, including non-zoom and zoom modes. The present techniques include using a feedback mechanism to provide dynamic AF and/or image stabilization. When zoom is enabled, the present techniques may facilitate analyzing the current zoom settings. For example, the present techniques may send zoom information (e.g., a zoom level value, a zoom percentage with 0% being no zoom and 100% being maximum zoom, etc.) to an AF system inside a camera. In some cases, the AF system may use the zoom information as an input among one or more inputs. In some cases, AF system may change the movement of one or more motors (e.g., at least one of a voice coil motor, piezo motor, stepper motor, servo motor, electrostatic actuator, magnetic actuator, or any combination thereof) to move a lens element and/or move an image sensor based at least in part on the zoom information and increase the focus of the image and decrease image blur.

In some cases, the present techniques may include two or more AF configurations for zoom and non-zoom operations. In one example, the present techniques may include implementing a non-zoom AF configuration when the level of zoom fails to exceed a first zoom threshold, and moving a motor of a lens element a first calibrated amount based on the non-zoom AF configuration. In some cases, the non-zoom AF configuration may be a default zoom configuration. In some examples, the present techniques may include implementing at least one zoom AF configuration when the level of zoom exceeds the first zoom threshold, and, among other potential adjustments, moving the motor of the lens element a second calibrated amount based on the implemented AF zoom configuration. In some cases, the camera may include one or more lens elements and one or more image sensors. Accordingly, in some cases the one or more motors may move at least one motor of a first lens elements and/or move at least one motor of a second lens element. Similarly, the one or more motors may move at least one motor of a first image sensor and/or move at least one motor of a second image sensor.

Aspects of the disclosure are initially described in the context of digital images (e.g., one or more images, an image stream, etc.) and process flows related to image stabilization in zoom mode. Aspects of the disclosure are further illustrated by and described with reference to apparatus diagrams, system diagrams, and flowcharts that relate to enhancing image stabilization in zoom mode.

FIG. 1 illustrates an example of a digital image system 100 that supports image stabilization in zoom mode in accordance with aspects of the present disclosure. As shown, digital image system 100 may include device 105. In the illustrated example, device 105 may include a display 110. In some cases, device 105 may include a camera 115 for capturing still images and/or video images. In some cases, camera 115 may include a front-facing camera as shown. In some cases, device 105 may also include a rear-facing camera. In one example, device 105 may capture images by an image sensor of camera 115 on device 105 that is interoperable with a processor of device 105 capable of implementing aspects of the present disclosure. Additionally or alternatively, digital image system 100 may be obtained by a device (e.g., a wireless device) via a transmission received from another device (e.g., over a wireless link, a wired link, a portable memory, etc.). As shown, display 110 may display pictures captured by camera 115 on device 105 and/or a camera wireless connected to device 105.

Although reference is made to camera 115, it is understood that the description of camera 115 applies to a front-facing camera of device 105 or a rear-facing camera of device 105. In some examples, camera 115 may include one or more autofocus (AF) motors or other components to adjust the focus of images captured by the one or more cameras. In one example, camera 115 may include one or more adjustable lens elements. In some cases, camera 115 may include one or more adjustable image sensors. In some cases, camera 115 may include an AF motor to adjust at least one adjustable lens element of camera 115. Additionally or alternatively, camera 115 may include an AF motor to adjust at least one adjustable image sensor.

As shown, device 105 may include an autofocus manager 120. Aspects of the present disclosure relate to autofocus manager 120 enabling improved techniques for autofocus and/or image stabilization when camera 115 is used in zoom mode. For example, autofocus manager 120 may include a non-zoom AF configuration and one or more zoom AF configurations. In one example, autofocus manager 120 may store AF configurations in a memory or storage device of device 105. In some cases, autofocus manager 120 may implement one of the multiple AF configurations based on a selected zoom level of camera 115.

For example, autofocus manager 120 may implement a non-zoom AF configuration when zoom is not being used on camera 115. Similarly, autofocus manager 120 may implement a zoom AF configuration when zoom is being used on camera 115. In some cases, autofocus manager 120 may implement a first zoom AF configuration for a first level of zoom and implement a second zoom AF configuration for a second level of zoom on camera 115, where the second level of zoom is a different (e.g., higher) level of zoom than the first level of zoom. In some cases, the motor movements actuated by the implemented AF configurations may be more precise as zoom increases.

For example, where the second level of zoom is a higher level of zoom than the first level of zoom, the non-zoom AF configuration may have a first level of precision, the first zoom AF configuration may have a second level of precision that is more precise than the first level of precision (e.g., relatively smaller movements of adjustable AF motors in the second level of precision than with the first level of precision), and the second zoom AF configuration may have a third level of precision that is more precise than the first level of precision and the second level of precision (e.g., relatively smaller movements of adjustable AF motors in the third level of precision than with the first level of precision and the second level of precision). The autofocus manager 120 enabling a camera to adjust autofocus based on one or more levels of zoom will results in less blur in preview of images and will also results in less blur in captured images compared to cameras without autofocus manager 120 and its related functions.

Figure 2:
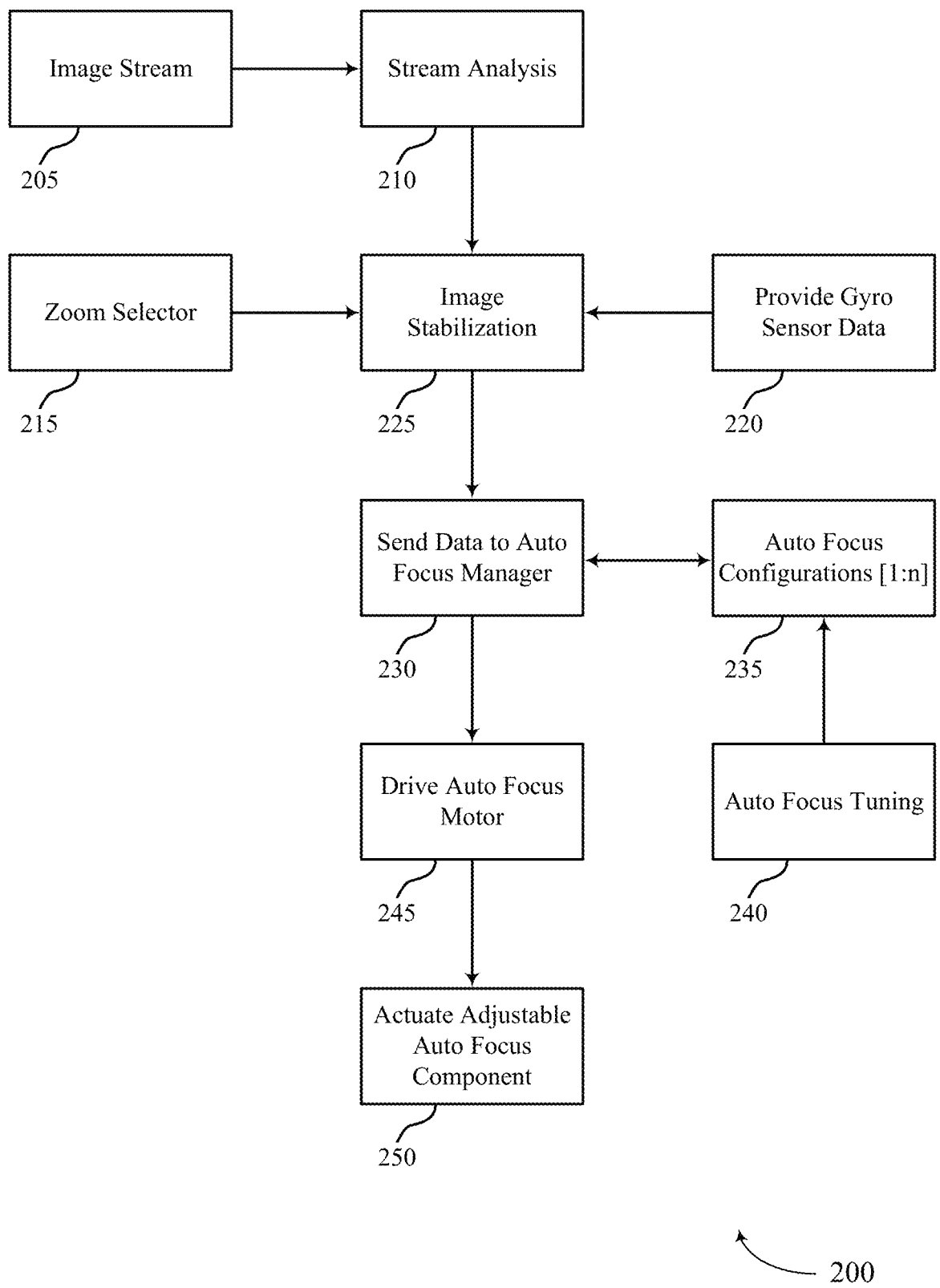
FIGS. 2 through 5 show diagrams illustrating methods, devices, and components that support image stabilization in zoom mode in accordance with aspects of the present disclosure.

FIG. 2 illustrates an example of a process flow 200 that supports image stabilization in zoom mode in accordance with aspects of the present disclosure. In some examples, process flow 200 may in some cases be performed by a device performing the processing operations described with reference to digital image system 100 (e.g., at least one processor of device 105). Additionally or alternatively, process flow 200 may be performed by another device (e.g., a server, a remote device, or the like), and the output of process flow 200 may be communicated to the device (e.g., via a wireless link, via a non-transitory computer readable medium, or the like). One or more operations of process flow 200 may be performed by or in conjunction with autofocus manager 120. Additionally or alternatively, one or more operations of process flow 200 may be performed by or in conjunction with at least one of a lens adjustment motor, an image sensor adjustment motor, a gyro sensor, image stabilization system, or the like, or any combination thereof. Additionally, other components or systems, or combinations thereof, may be used to perform one or more operations of process flow 200.

At 205, an image stream may be generated. In some cases, the image stream may include images captured live or in real time by an image sensor of a camera or device with a camera. In some cases, the camera may include a display where the images may be shown. In one example, a smartphone may display the image stream on a display of the smartphone.

At 210, the images from the image stream of 205 may be analyzed. For example, one or more images from the image stream of 205 may be selected for analysis (e.g. randomly selected, selected by image number in a sequence of images, etc.). In some cases, the analysis of the image stream may include using an image processor to analyze the images. In some cases, the analysis of the image stream may include passing one or more images selected for analysis through at least one algorithm. Passing an image through an algorithm may include analyzing information in an image (e.g., pixel content, brightness, contrast, resolution, blur, etc.) and computing information based on the analysis to use for adjustments to autofocus on an associated camera. For example, one or more images selected for analysis may be passed through a first algorithm (e.g., a jitter algorithm) to determine whether jitter or hand shaking is evident in the analyzed images. Additionally or alternatively, one or more images selected for analysis may be passed through a second algorithm (e.g., a blur algorithm) to determine whether blur or lack of focus is evident in the analyzed images.

At 215, a zoom selection may be provided to or determined by a component, such as an image stabilization controller. For example, a user may activate zoom on a camera (e.g., camera 115 of device 105 in FIG. 1). In some cases, a user may adjust a level of zoom (e.g., increase level of zoom, decrease level of zoom). In some cases, a user may deactivate zoom. In any case, at 215 a zoom selection or zoom adjustment may be communicated or may be performed (to or by an image stabilization controller).

At 220, data from one or more sensors (e.g., gyro sensors) may be provided to or received by the image stabilization controller. In some cases, a camera may include one or more gyros sensors. In some cases, a camera may include a camera for two or more positioning axes. In one example, the gyro sensor data at 220 may be provided by at least one of an x-axis gyro, a y-axis gyro, or a z-axis gyro, or any combination thereof. Additionally or alternatively, the one or more sensors may include one or more accelerometers (e.g., one or more single axis accelerometers, one or more two-axis accelerometers, etc.), among other examples.

At 225, an image stabilization controller may perform image stabilization on one or more images from the image stream of 205. In some cases, the image stabilization may be based on the results of the analysis of the image stream performed at 210. Additionally or alternatively, the image stabilization may be based on the selected zoom indicated at 215. Additionally or alternatively, the image stabilization may be based on the sensor data, such as gyro sensor data, provided at 220. In one example, the image stabilization may include compensating for one or more conditions detected in the analysis of the image stream. For example, the image stabilization may include compensating for detected jitter. In one example, compensating for detected jitter may include actuating one or more image stabilization motors to counteract the effects of the detected jitter. In this way, the image may be stabilized or otherwise be adjusted to compensate for detected conditions that may otherwise degrade image quality.

At 230, an autofocus manager (e.g., autofocus manager 120 of FIG. 1) may receive information (e.g., from the image stabilization controller). In some cases, the image stabilization controller may send a set of data to the autofocus manager (e.g., at least one of analysis from 210, zoom selection from 215, gyro sensor data from 220, or any combination thereof). In one example, the image stabilization controller may send the selected level of zoom indicated at 215 (e.g., no zoom, a first zoom level within a first zoom range, a second zoom level within a second zoom range different from the first zoom range, etc.).

At 235, the autofocus manager may select an AF configuration to implement based at least in part on one or more factors, such as the selected level of zoom provided by the image stabilization controller. In one example, a memory or storage device of the camera may store a 1st AF configuration to an nth AF configuration, where n may be a positive integer equal to 2 or greater. In some cases, before and/or during selecting and implementing an AF configuration the autofocus manager may determine whether autofocus is activated. The autofocus manager may determine whether autofocus is activated to determine whether to implement an autofocus configuration. For example, after determining autofocus is deactivated, the autofocus manager may refrain from updating a current AF configuration and/or making any AF adjustments (e.g., actuating AF motors to adjust a focus of the camera, etc.). In some cases, after determining autofocus is disabled the autofocus manager may continue monitoring whether autofocus remains deactivated or whether it becomes activated at a later time. For example, the autofocus manager may continue to monitor whether autofocus remains deactivated to continue to refrain from implementing an AF configuration.

After determining autofocus is activated, autofocus manager may determine whether zoom is currently activated. In one example, the autofocus manger may determine whether zoom is activated based at least in part on the selected level of zoom provided at 230. In one example, the selected level of zoom may indicate a percentage of zoom, where 0% indicates no zoom and 100% indicates a maximum zoom. When the autofocus manager determines that zoom changes from activated zoom to deactivated zoom (e.g., 0% zoom) at a second time, the autofocus manager may select and implement a non-zoom AF configuration. When the autofocus manager determines that zoom remains deactivated at a second time, the autofocus manager may maintain the non-zoom AF configuration. When the autofocus manager determines that zoom changes from deactivated zoom to activated zoom at a second time, the autofocus manager may select and implement a zoom AF configuration. When the autofocus manager determines that zoom remains activated at a second time, the autofocus manager may maintain the zoom AF configuration.

As indicated above, a level of zoom may range from a deactivated zoom level (e.g., 0% zoom), a first range of zoom (e.g., a lower range of zoon, in a 1% to 50% range of maximum zoom), or a second range of zoom (e.g., a higher range of zoom than the first or lower range of zoom, in a 51% to 100% range of maximum zoom). Upon determining zoom is active, the autofocus manager may determine whether the selected level of zoom is within the first range of zoom or within the second range of zoom. In some examples, the first (e.g., lower) range of zoom may overlap with the second (e.g., higher) range of zoom. For example, the lower range of zoom may include any range of zoom within 1% to 99% of maximum zoom (e.g., 1% to 51%), and the higher range of zoom may include any range of zoom within 2% to 100% of maximum zoom (e.g., 52% to 100%). Accordingly, when the autofocus manager determines that zoom changes from deactivated zoom (e.g., 0% zoom) or the higher range of zoom to the lower range of zoom, the autofocus manager may select an implement a lower zoom AF configuration.

Similarly, when the autofocus manager determines that zoom changes from deactivated zoom or the lower range of zoom to the higher range of zoom, the autofocus manager may select an implement a higher zoom AF configuration. When the autofocus manager determines that zoom remains within the lower range of zoom, the autofocus manager may maintain the lower zoom AF configuration; and when the autofocus manager determines that zoom remains within the higher range of zoom, the autofocus manager may maintain the higher zoom AF configuration. Although multiple zoom AF configurations are described herein with reference to two zoom AF configurations (e.g., lower zoom AF configuration and higher zoom AF configuration), it is understood that that a non-zoom AF configuration and two or more zoom AF configurations may be implemented (e.g., first zoom AF configuration for 1% to 33% of maximum zoom, second zoom AF configuration for 34% to 66% of maximum zoom, and third AF configuration for 67% to 100% of maximum zoom, etc.).

At 240, the autofocus manager may perform autofocus tuning to generate one or more AF configurations. For example, AF motors and adjustable AF components (e.g., adjustable AF lens elements, adjustable AF image sensor elements, etc.) may be tested and calibrated to identify one or more models for AF adjustments at various levels of zoom. In some examples, the autofocus manager may test a range AF adjustments at various degrees of movement (e.g., movement of lens motors, movement of image sensor motors, etc.) to determine the optimal rate of movement at a given level of zoom. Upon determining the optimal rate of movement at each possible level of zoom, two or more AF configurations may be implemented in a device (e.g., a camera). In some cases, autofocus tuning may include determining one or more thresholds at which one of the two or more AF configurations may be triggered for implementation. For example, autofocus tuning may include determining a first zoom threshold below which (e.g., a zoom level below the first zoom threshold) a first AF configuration is implemented and above which a second AF configuration is implemented. In some cases, autofocus tuning may include determining a second zoom threshold greater than the first zoon threshold, where a zoom level above the second zoom threshold triggers implementing a third AF configuration.

At 245, the autofocus manager may activate a driver to drive a measured amount of power to one or more AF motors (e.g., at least one of a voice coil motor, piezo motor, stepper motor, servo motor, electrostatic actuator, magnetic actuator, or any combination thereof). For example, the autofocus manager may activate a lens driver to drive a measured amount of power to a lens motor. In some cases, the measured amount of power to be applied may be indicated by the implemented AF configuration.

At 250, the autofocus manager, in conjunction with one or more lens motors and/or one or more image sensor motors, may actuate an adjustable AF component (e.g., adjustable AF lens elements, adjustable AF image sensor elements, etc.) based on the measured amount of power applied to the one or more AF motors. In one example, under identical conditions, where merely the level of zoom differs, implementing the non-zoom AF configuration results in a first amount of movement by the adjustable AF component; implementing the lower zoom AF configuration results in a second amount of movement by the adjustable AF component that is smaller than the first amount of movement; and implementing the higher zoom AF configuration results in a third amount of movement by the adjustable AF component that is smaller than both the first amount of movement and the second amount of movement.

Figure 3:
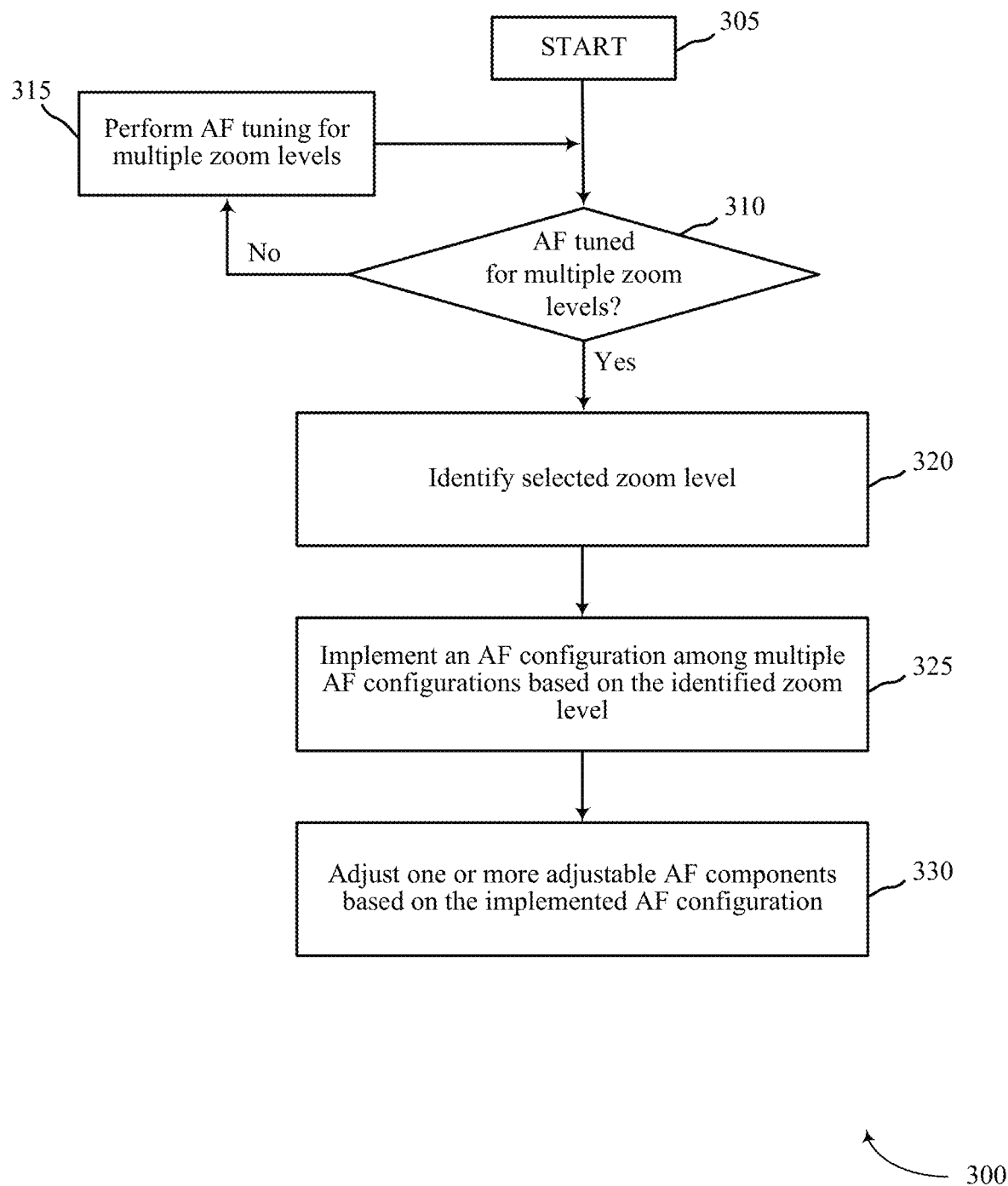

FIG. 3 shows a flowchart illustrating a method 300 that supports image stabilization in zoom mode in accordance with aspects of the present disclosure. The operations of method 300 may be implemented by a device or its components (e.g., one or more image processors, one or more image memory devices, one or more lens motors, one or more image sensor motors, or any combination thereof) as described herein. For example, the operations of method 300 may be performed by an autofocus manager as described with reference to FIGS. 1 and 2. In some examples, a device may execute a set of instructions to control the functional elements of the device to perform the functions described below. Additionally or alternatively, a device may perform aspects of the functions described below using special-purpose hardware At 305, method 300 may be initiated based on one or more instructions, commands, or conditions. In some cases, the method 300 may be initiated by an autofocus manager in response to autofocus manager determining autofocus has been activated, or in response to autofocus manager determining zoom has been activated or a zoom level has changed, or any combination thereof. In some cases, the method 300 may be initiated when a camera is activated (e.g., camera 115 of FIG. 1, etc.).

At 310, method 300 may include determining whether the adjustable AF components of a camera are configured to be able to move for (e.g., tunable, tuned for) multiple levels of zoom. For example, method 300 may determine whether two or more AF configurations have been created for different conditions, such as one or more deactivated or lesser zoom conditions and one or more activated zoom conditions (e.g., where the zoom level is greater than threshold).

At 315, method 300 may perform autofocus tuning when method 300 determines that the adjustable AF components of a camera are not tuned for multiple levels of zoom. In one example, method 300 may calibrate the movements of the adjustable AF components based on a determination that zoom is deactivated, based on a determination zoom is activated, based on a determination of a zoom level, based on a detected change from a first zoom level to a second zoom level, or any combination thereof.

At 320, method 300 may include identifying a selected level of zoom. For example, a camera may enable a user to select a level of zoom. In one example, a camera may include one or more buttons to enable a user to select a level of zoom. Additionally or alternatively, a camera may include a touch screen and enable a user to control zoom using on-screen controls.

At 325, method 300 may include implementing an AF configuration from among multiple AF configurations based on the zoom level identified at 320. For example, method 300 may determine that a camera is being operated in a first mode (e.g., with zoom deactivated). Accordingly, method 300 may implement a non-zoom AF configuration to control the adjustable AF components. In some cases, method 300 may determine that a camera is being operated in a second mode (e.g., with zoom activated). Accordingly, method 300 may implement a zoom AF configuration to control the adjustable AF components.

At 330, method 300 may include adjusting one or more adjustable AF components based on the AF configuration implemented at 325. In some cases, an AF configuration may include information regarding which adjustable AF component (e.g., lens motor, image sensor motor, etc.) to adjust for a given determined zoom setting. For example, method 300 may include querying the implemented AF configuration to identify which adjustable AF component to actuate, and identify the amount of power with which to drive the identified adjustable AF component, resulting in the adjustable AF component being actuated a precise amount of movement based on the selected level of zoom. Implementing multiple AF configurations enables a camera to adjust autofocus tuning based on a given level of zoom, which enables the camera in some cases to capture images with less blur.

Figure 4:
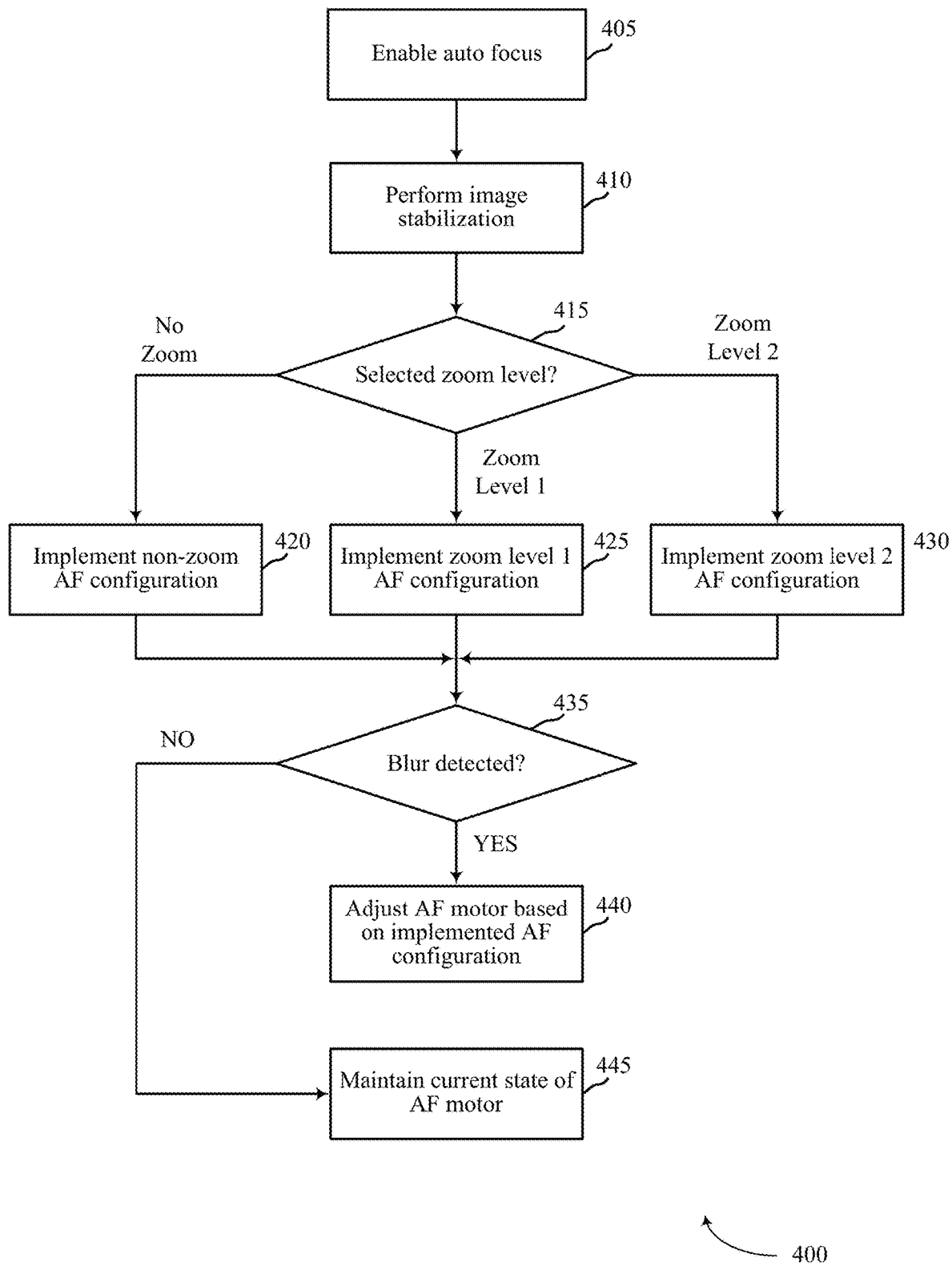

FIG. 4 shows a flowchart illustrating a method 400 that supports image stabilization in zoom mode in accordance with aspects of the present disclosure. The operations of method 400 may be implemented by a device or its components as described herein. For example, the operations of method 400 may be performed by an autofocus manager as described with reference to FIGS. 1 and 2. In some examples, a device may execute a set of instructions to control the functional elements of the device to perform the functions described below. Additionally or alternatively, a device may perform aspects of the functions described below using special-purpose hardware At 405, method 400 may enable an autofocus operation or setting. For example, method 400 may include adjusting the settings of a camera (e.g., camera 115 of FIG. 1) to enable an autofocus feature of the camera. In some cases, autofocus may be enabled by default.

At 410, method 400 may include performing image stabilization. In some cases, method 400 may include an image stabilization controller. In some examples, an image stabilization controller may detect jitter and/or shaking of a camera and adjust one or more adjustable components (e.g., lens motor, image sensor motor, etc.) to compensate for the detected jitter and/or shaking. In some cases, an autofocus manager (e.g., autofocus manager 120) may perform image stabilization in conjunction with an image stabilization controller.

At 415, method 400 may include determining whether a level of zoom is selected or which level of zoom is selected. In some cases, method 400 may include identifying a selected level of zoom. For example, method 400 may determine whether a zoom feature is activated (e.g., enabled) or deactivated (e.g., disabled). After determining zoom is deactivated, method 400 may determine that the selected level of zoom is no zoom or 0% of maximum zoom. After determining that zoom is activated, method 400 may identify a selected a level of zoom (e.g., 25% of maximum zoom, etc.). In some examples, after determining zoom is activated, method 400 may determine whether the selected level of zoom is within a first level or range of zoom condition (e.g., within a lower level of zoom) or within a second level or range of zoom condition (e.g., within an upper level of zoom).

At 420, method 400 may implement a non-zoom AF configuration after determining at 415 that zoom is deactivated. At 425, method 400 may implement a first level of zoom after determining at 415 that zoom is activated and that the current level of zoom is within a lower level of zoom. At 430, method 400 may implement a second level of zoom after determining at 415 that zoom is activated and that the current level of zoom is within an upper level of zoom.

At 435, method 400 may include determining whether blur is detected in one or more images. For example, method 400 may analyze one or more images and determine whether the image is blurry using one or more techniques, including, but not limited to, phase detection, contrast detection, etc. In some cases, method 400 may analyze a stream of images (e.g., a live stream or preview stream of images, etc.) to determine whether blur exists in at least some of the stream of images.

At 440, when method 400 determines blur exists in the one or more images analyzed at 435, method 400 may adjust one or more components (e.g., such as an AF motor) in accordance with the settings of the AF configuration selected and implemented at 420, 425, or 430.

At 445, when method 400 determines blur does not exist in the one or more images analyzed at 435, method 400 may select or maintain a current state (e.g., of the AF motor). For example, method 400 may refrain from making an autofocus adjustments when method 400 determines blur does not exist in the one or more images analyzed at 435. Method 400 may enable a camera to detect blur in a stream of images (e.g., image preview on a display of a camera) and make dynamic autofocus adjustments (e.g., adjusting one or more lens motors, adjusting one or more image sensor motors, etc.) based on a detected level of zoom (e.g., 0% zoom to 100% zoom) to reduce the blur in the stream of images.

Figure 5:
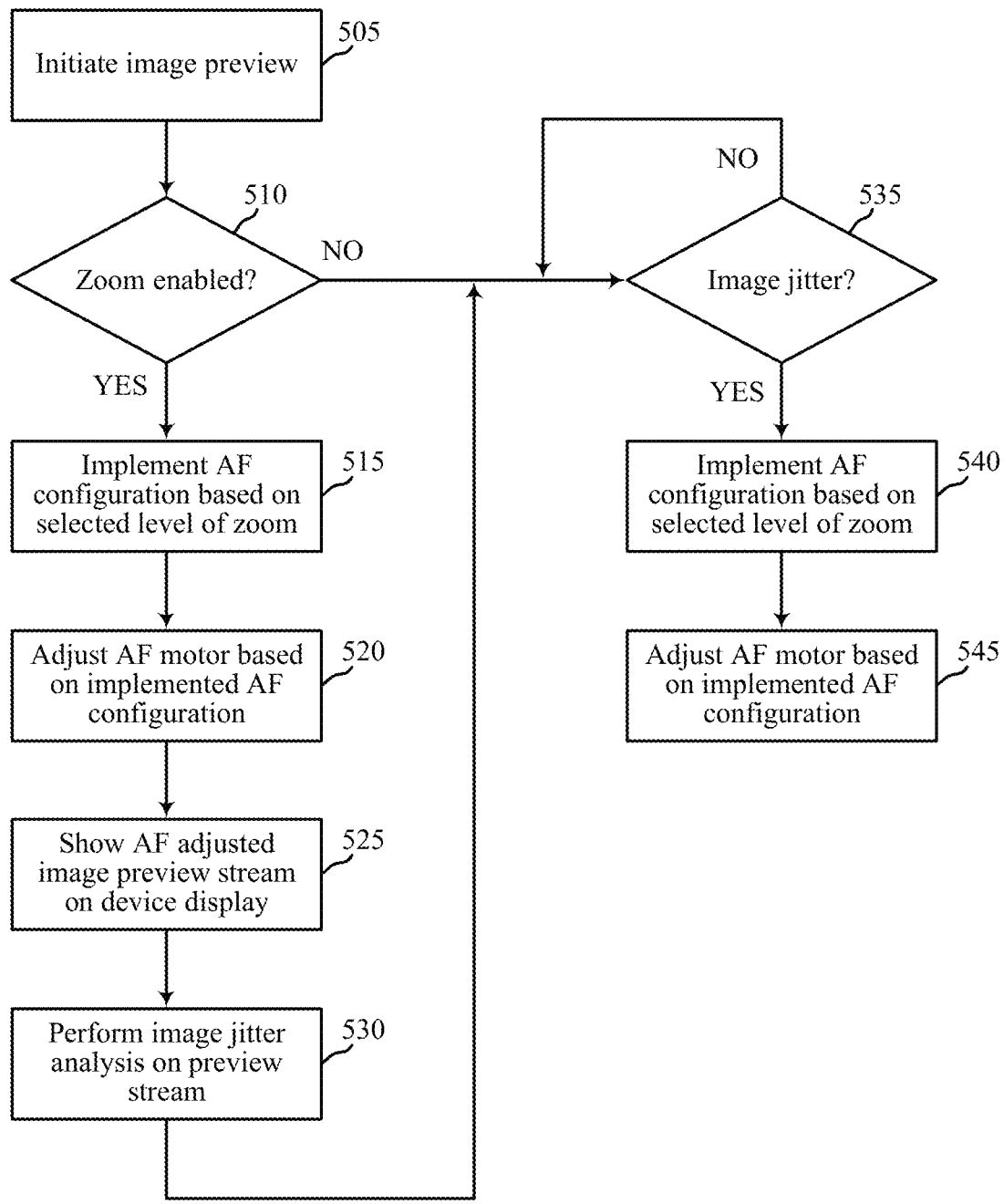

FIG. 5 shows a flowchart illustrating a method 500 that supports image stabilization in zoom mode in accordance with aspects of the present disclosure. The operations of method 500 may be implemented by a device or its components as described herein. For example, the operations of method 500 may be performed by an autofocus manager as described with reference to FIGS. 1 and 2. In some examples, a device may execute a set of instructions to control the functional elements of the device to perform the functions described below. Additionally or alternatively, a device may perform aspects of the functions described below using special-purpose hardware At 505, method 500 includes initiating an image preview. In one example, initiating the image preview may include initiating real time analysis of images being captured by an image sensor of a camera (e.g., camera 115 of FIG. 1). In some cases, initiating the image preview may include initiating a live display of images being captured by the image sensor of the camera on a display of the camera. Image preview may include an image sensor of the camera detecting color and light and displaying the detected color and light on a display of the camera in real-time.

At 510, method 500 may include determining whether zoom is enabled on the camera. In some cases, method 500 may determine a selected level of zoom after determining zoom is enabled. For example, method 500 may determine whether the selected level of zoom indicates zoom is deactivated (e.g., 0% selected level of zoom) or whether the selected level of zoom indicates zoom is activated (e.g., selected level of zoom of 1% to 100%).

At 515, method 500 may include implementing an AF configuration based on the selected level of zoom after determining at 510 that zoom is enabled. In some cases, a camera may include a memory and/or a storage device. In some cases, method 500 may include generating and storing two or more AF configurations in the memory and/or storage device. For example, method 500 may select from two or more AF configurations stored in the memory where each AF configuration is associated with a particular selected level of zoom or a particular range of zoom. For example, a first AF configuration may be associated with a selected level of zoom of 0% zoom, a second AF configuration may be associated with a zoom range of 1% zoom to 40% zoom, and a third AF configuration may be associated with a zoom range of 41% zoom to 100% zoom.

At 520, method 500 may include adjusting an AF motor based on the AF configuration implemented at 515. For example, method 500 may cause an image sensor motor to physically move a component, such as an image sensor, of the camera relative to a second component, such as the lens, a certain (e.g., constant, variable based on one or more conditions) amount based on the settings of the implemented AF configuration. For example, the implemented AF configuration may specify that the image sensor motor is moved a specified amount.

At 525, method 500 may include showing an adjusted image preview stream on a display of the camera (e.g., display 110 of FIG. 1). For example, the adjusting of the AF motor at 520 may result in zoom-level-based adjustments to the images of image preview 505, and at 525 the zoom-level-based AF adjusted images may be shown on the display of the camera.

At 530, method 500 may include performing image jitter analysis on the preview stream. For example, method 500 may analyze the zoom-level-based AF adjusted images to determine whether jitter is present in the analyzed images. In some cases, method 500 may include analyzing data from one or more gyro sensors to determine whether jitter is present in the analyzed images.

At 535, method 500 may determine whether hand-shake jitter exists in the zoom-level-based AF adjusted images based on the analysis at 530. Alternatively, after determining at 510 that zoom is not enabled, method 500 may jump to 535 to determine whether hand-shake jitter exists in the preview images of 505. When method 500 determines that hand-shake jitter does not exist, method 500 may continue monitoring for hand-shake jitter.

At 540, method 500 may include implementing an AF configuration based on the selected level of zoom after determining at 535 that hand shake jitter exists in the analyzed images. For example, method 500 may implement a default non-zoom AF configuration after determining at 510 that zoom is not enabled and then determining at 535 that jitter is present. Alternatively, method 500 may implement a zoom-based AF configuration after determining at 510 that zoom is enabled and then determining at 535 that jitter is present.

At 545, method 500 may include adjusting an AF motor based on the AF configuration implemented at 540. For example, method 500 may cause a lens motor to physically move a lens element of the camera relative to the image sensor a certain amount based on the settings of the implemented AF configuration.

Figure 6:
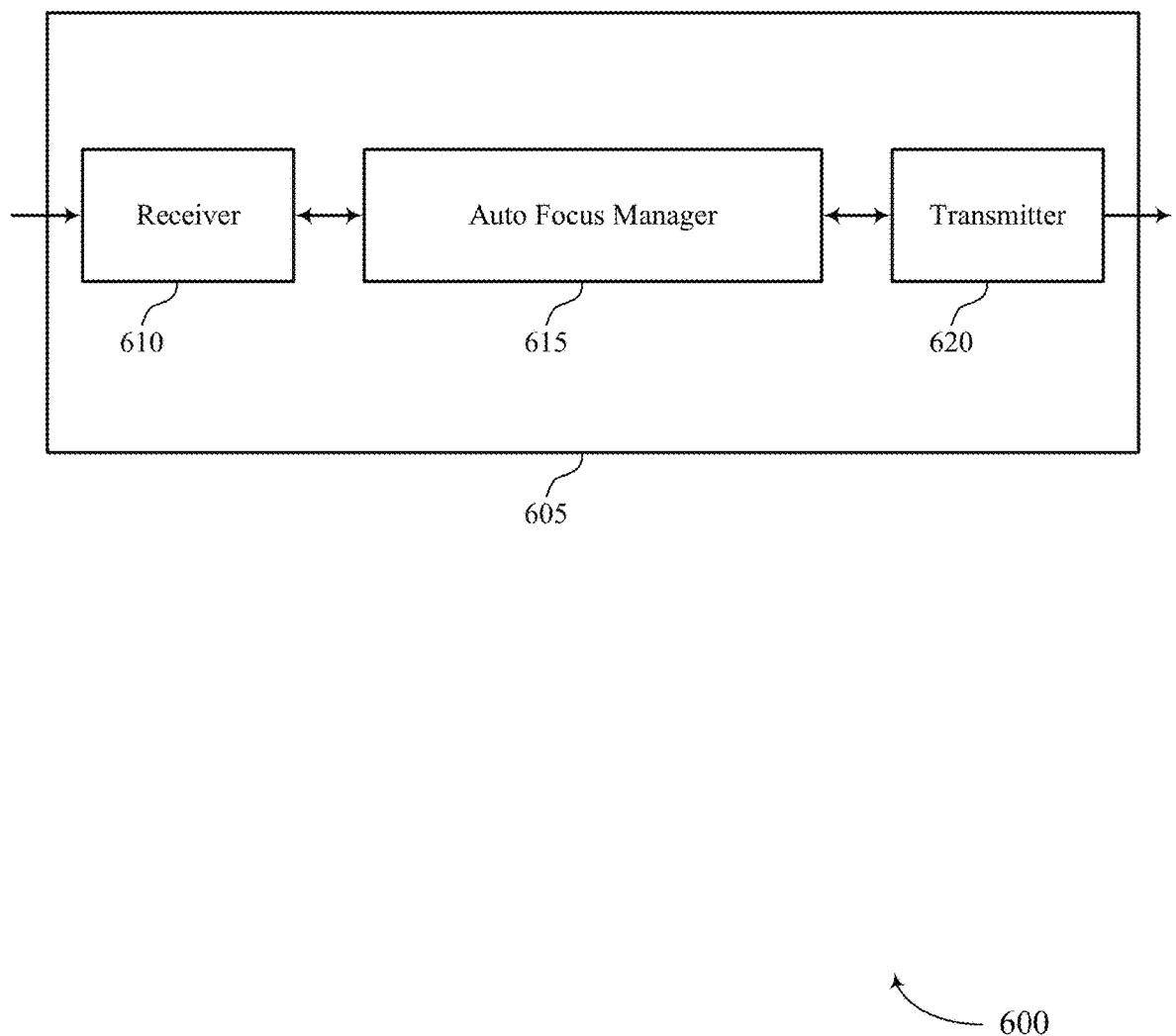
FIGS. 6 and 7 show block diagrams of devices that support image stabilization in zoom mode in accordance with aspects of the present disclosure.

FIG. 6 shows a block diagram 600 of a device 605 that supports image stabilization in zoom mode in accordance with aspects of the present disclosure. The device 605 may be an example of aspects of a device as described herein. The device 605 may include a receiver 610, an auto focus manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to image stabilization in zoom mode, etc.). Information may be passed on to other components of the device 605. The receiver 610 may be an example of aspects of the transceiver 920 described with reference to FIG. 9. The receiver 610 may utilize a single antenna or a set of antennas.

The auto focus manager 615 may detect blurring in one or more images from a stream of images captured by a camera based on monitoring the stream of images, identify a level of zoom based on detecting the blurring, select an autofocus configuration from a set of autofocus configurations based on the identified level of zoom, and perform an autofocus operation using the selected autofocus configuration. The auto focus manager 615 may be an example of aspects of the auto focus manager 910 described herein.

The auto focus manager 615, or its sub-components, may be implemented in hardware, code (e.g., software or firmware) executed by a processor, or any combination thereof. If implemented in code executed by a processor, the functions of the auto focus manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The auto focus manager 615, or its sub-components, may be physically located at various positions, including being distributed such that portions of functions are implemented at different physical locations by one or more physical components. In some examples, the auto focus manager 615, or its sub-components, may be a separate and distinct component in accordance with various aspects of the present disclosure. In some examples, the auto focus manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
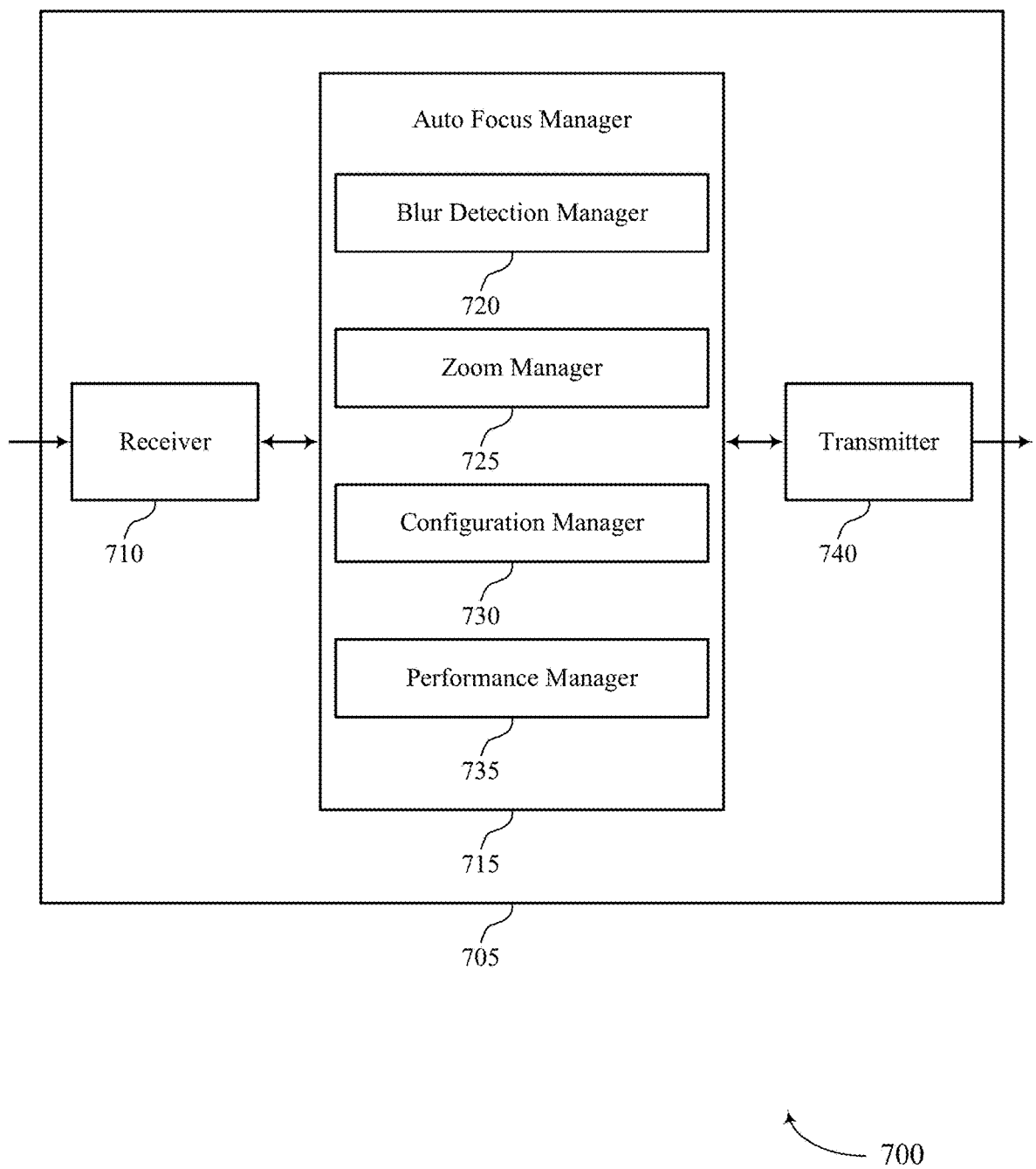

FIG. 7 shows a block diagram 700 of a device 705 that supports image stabilization in zoom mode in accordance with aspects of the present disclosure. The device 705 may be an example of aspects of a device 605 or a device 105 as described herein. The device 705 may include a receiver 710, an auto focus manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to image stabilization in zoom mode, etc.). Information may be passed on to other components of the device 705. The receiver 710 may be an example of aspects of the transceiver 920 described with reference to FIG. 9. The receiver 710 may utilize a single antenna or a set of antennas.

The auto focus manager 715 may be an example of aspects of the auto focus manager 615 as described herein. The auto focus manager 715 may include a blur detection manager 720, a zoom manager 725, a configuration manager 730, and a performance manager 735. The auto focus manager 715 may be an example of aspects of the auto focus manager 910 described herein.

The blur detection manager 720 may detect blurring in one or more images from a stream of images captured by a camera based on monitoring the stream of images. The zoom manager 725 may identify a level of zoom based on detecting the blurring. The configuration manager 730 may select an autofocus configuration from a set of autofocus configurations based on the identified level of zoom.

The performance manager 735 may perform an autofocus operation using the selected autofocus configuration. The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
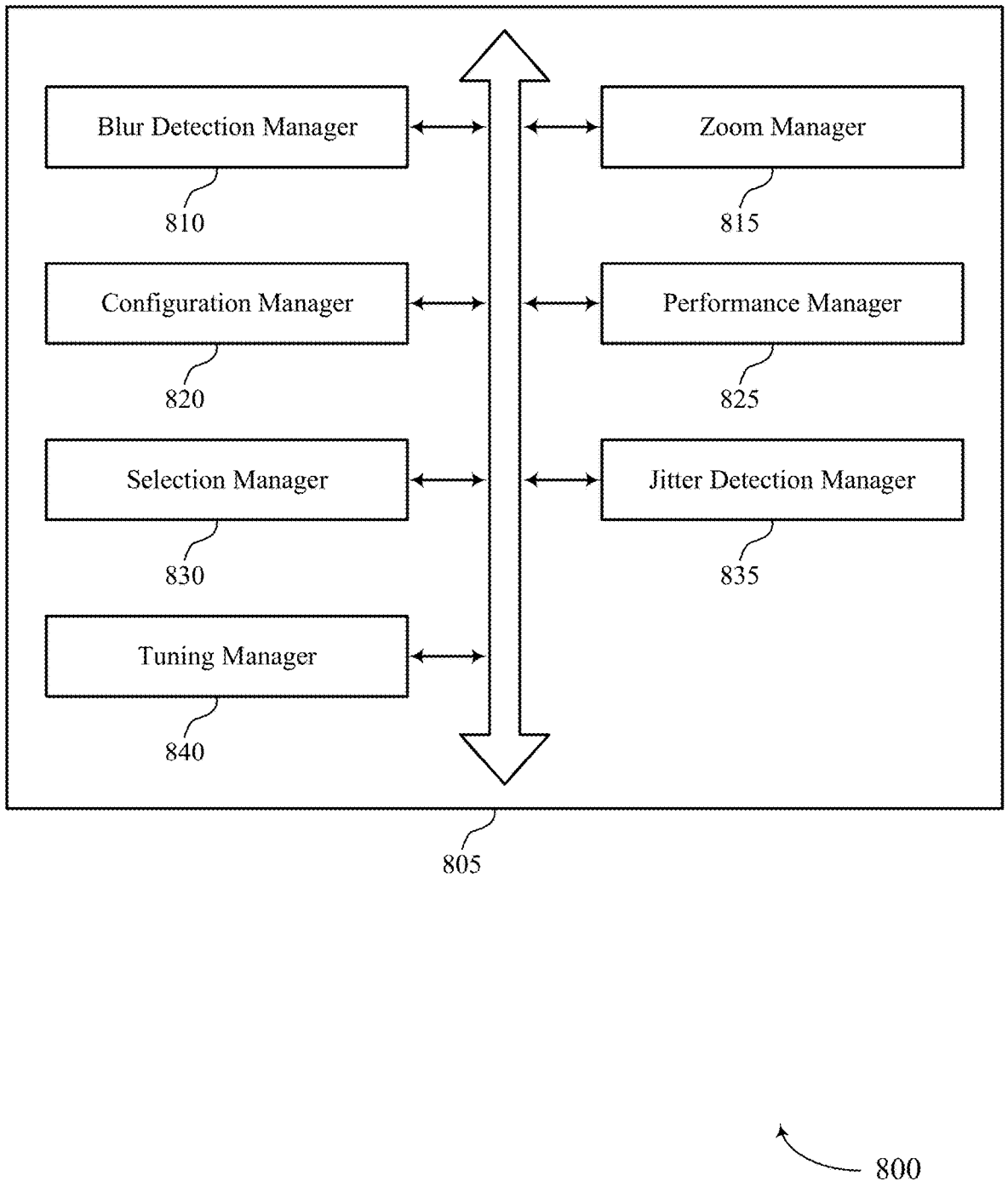
FIG. 8 shows a block diagram of an auto focus manager that supports image stabilization in zoom mode in accordance with aspects of the present disclosure.

FIG. 8 shows a block diagram 800 of an auto focus manager 805 that supports image stabilization in zoom mode in accordance with aspects of the present disclosure. The auto focus manager 805 may be an example of aspects of an auto focus manager 615, an auto focus manager 715, or an auto focus manager 910 described herein. The auto focus manager 805 may include a blur detection manager 810, a zoom manager 815, a configuration manager 820, a performance manager 825, a selection manager 830, a jitter detection manager 835, and a tuning manager 840. Each of these modules may communicate, directly or indirectly, with one another (e.g., via one or more buses).

The blur detection manager 810 may detect blurring in one or more images from a stream of images captured by a camera based on monitoring the stream of images. The zoom manager 815 may identify a level of zoom based on detecting the blurring.

In some examples, the zoom manager 815 may identify the level of zoom by a percentage value, where the percentage value at 100% indicates a maximum level of zoom and the percentage value at 0% indicates a minimum level of zoom. The configuration manager 820 may select an autofocus configuration from a set of autofocus configurations based on the identified level of zoom.

In some examples, the configuration manager 820 may generate a non-zoom autofocus configuration, a first zoom autofocus configuration, and a second zoom autofocus configuration, the set of autofocus configurations including at least one of the non-zoom autofocus configuration, the first zoom autofocus configuration, or the second zoom autofocus configuration.

In some examples, the configuration manager 820 selecting the autofocus configuration may include selecting one of the set of autofocus configurations based on the identified level of zoom satisfying a first zoom threshold, or based on satisfying a second zoom threshold greater than the first zoon threshold, or based on satisfying both, or based on satisfying neither threshold.

The performance manager 825 may perform an autofocus operation using the selected autofocus configuration. In some examples, the performance manager 825 may compensate for jitter by adjusting a position of one or more components of the camera at a rate of movement determined by the selected autoconfiguration when the detectable shaking exceeds the jitter threshold. In some examples, the performance manager 825 may mechanically adjust one or more autofocus motors. In some examples, the performance manager 825 may adjust at least one lens motor, or at least one image sensor motor, or both.

The selection manager 830 may select the non-zoom autofocus configuration when the identified level of zoom fails to satisfy the first zoom threshold. In some examples, the selection manager 830 may select the first zoom autofocus configuration when the identified level of zoom satisfies the first zoom threshold and fails to satisfy the second zoom threshold. In some examples, the selection manager 830 may select the second zoom autofocus configuration when the identified level of zoom satisfies both the first zoom threshold and the second zoom threshold.

The jitter detection manager 835 may determine whether a detectable shaking of the camera satisfies a jitter threshold. The tuning manager 840 may tune the one or more autofocus motors based on determining a rate of movement by the one or more autofocus motors relative to incremented levels of zoom varying from no zoom to maximum zoom.

Figure 9:
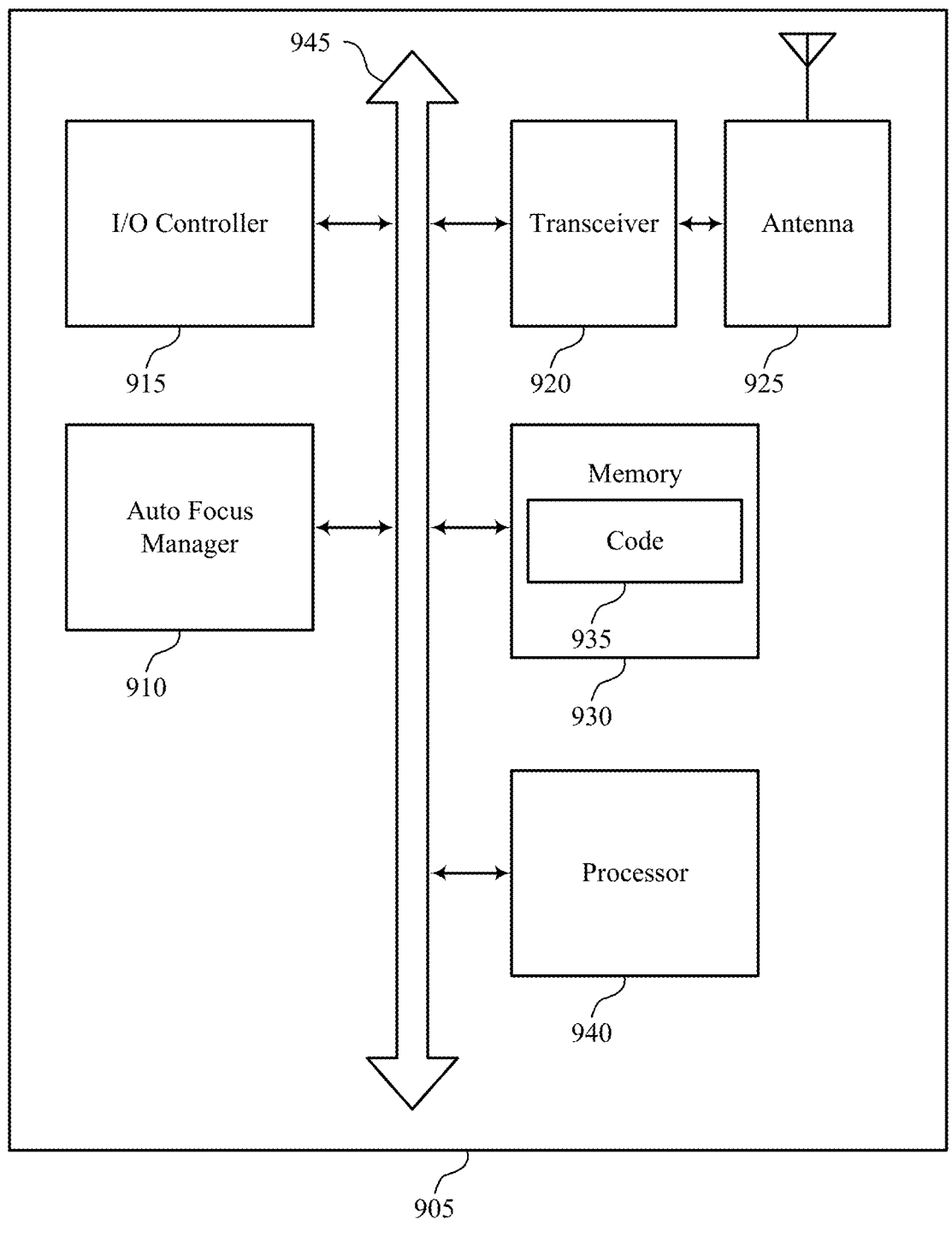
FIG. 9 shows a diagram of a system including a device that supports image stabilization in zoom mode in accordance with aspects of the present disclosure.

FIG. 9 shows a diagram of a system 900 including a device 905 that supports image stabilization in zoom mode in accordance with aspects of the present disclosure. The device 905 may be an example of or include the components of device 605, device 705, or a device as described herein. The device 905 may include components for bi-directional voice and data communications including components for transmitting and receiving communications, including an auto focus manager 910, an I/O controller 915, a transceiver 920, an antenna 925, memory 930, and a processor 940. These components may be in electronic communication via one or more buses (e.g., bus 945).

The auto focus manager 910 may detect blurring in one or more images from a stream of images captured by a camera based on monitoring the stream of images, identify a level of zoom based on detecting the blurring, select an autofocus configuration from a set of autofocus configurations based on the identified level of zoom, and perform an autofocus operation using the selected autofocus configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting image stabilization in zoom mode).

The code 935 may include instructions to implement aspects of the present disclosure, including instructions to support image processing. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
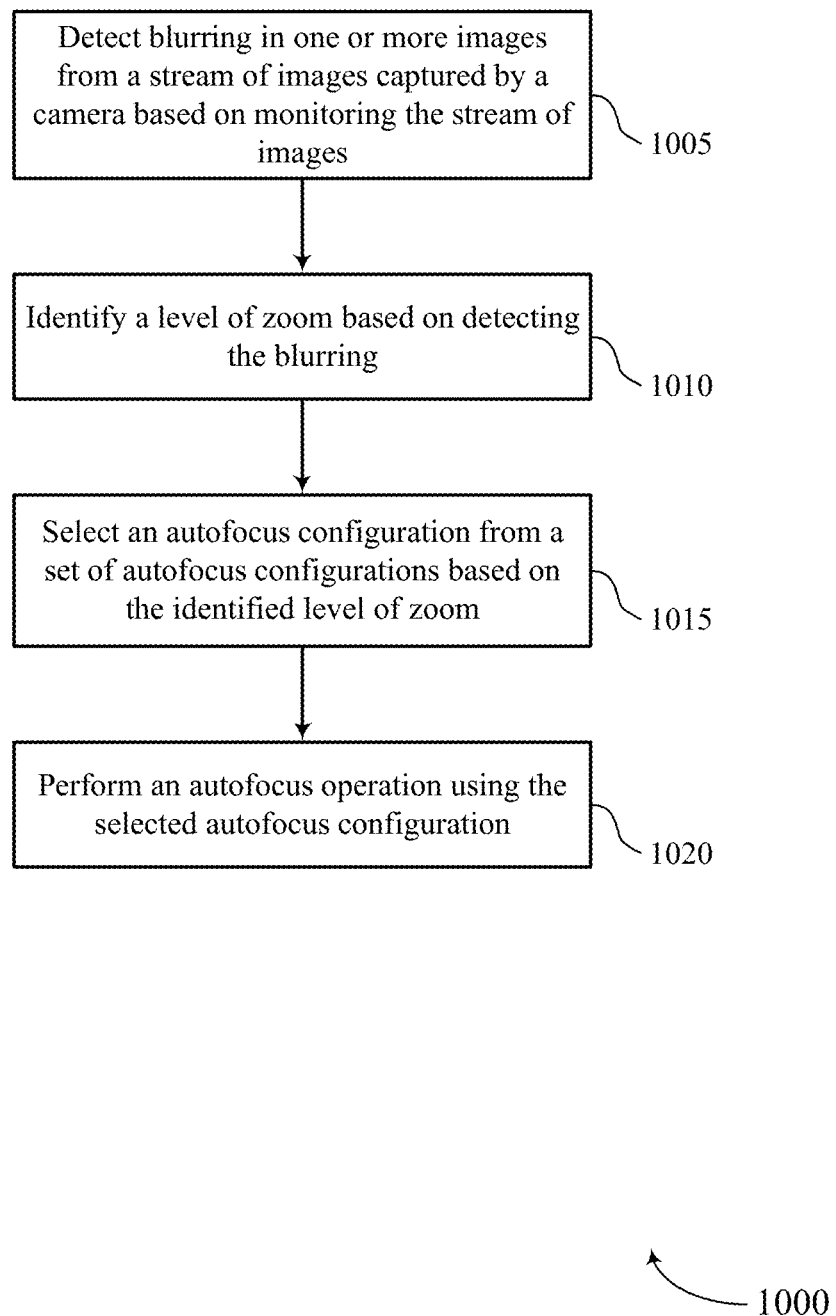
FIGS. 10 and 11 show flowcharts illustrating methods that support image stabilization in zoom mode in accordance with aspects of the present disclosure.

FIG. 10 shows a flowchart illustrating a method 1000 that supports image stabilization in zoom mode in accordance with aspects of the present disclosure. The operations of method 1000 may be implemented by a device or its components as described herein. For example, the operations of method 1000 may be performed by an auto focus manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1005, the device may detect blurring in one or more images from a stream of images captured by a camera based on monitoring the stream of images. The operations of 1005 may be performed according to the methods described herein. In some examples, aspects of the operations of 1005 may be performed by a blur detection manager as described with reference to FIGS. 6 through 9.

At 1010, the device may identify a level of zoom based on detecting the blurring. The operations of 1010 may be performed according to the methods described herein. In some examples, aspects of the operations of 1010 may be performed by a zoom manager as described with reference to FIGS. 6 through 9.

At 1015, the device may select an autofocus configuration from a set of autofocus configurations based on the identified level of zoom. The operations of 1015 may be performed according to the methods described herein. In some examples, aspects of the operations of 1015 may be performed by a configuration manager as described with reference to FIGS. 6 through 9.

At 1020, the device may perform an autofocus operation using the selected autofocus configuration. The operations of 1020 may be performed according to the methods described herein. In some examples, aspects of the operations of 1020 may be performed by a performance manager as described with reference to FIGS. 6 through 9.

Figure 11:
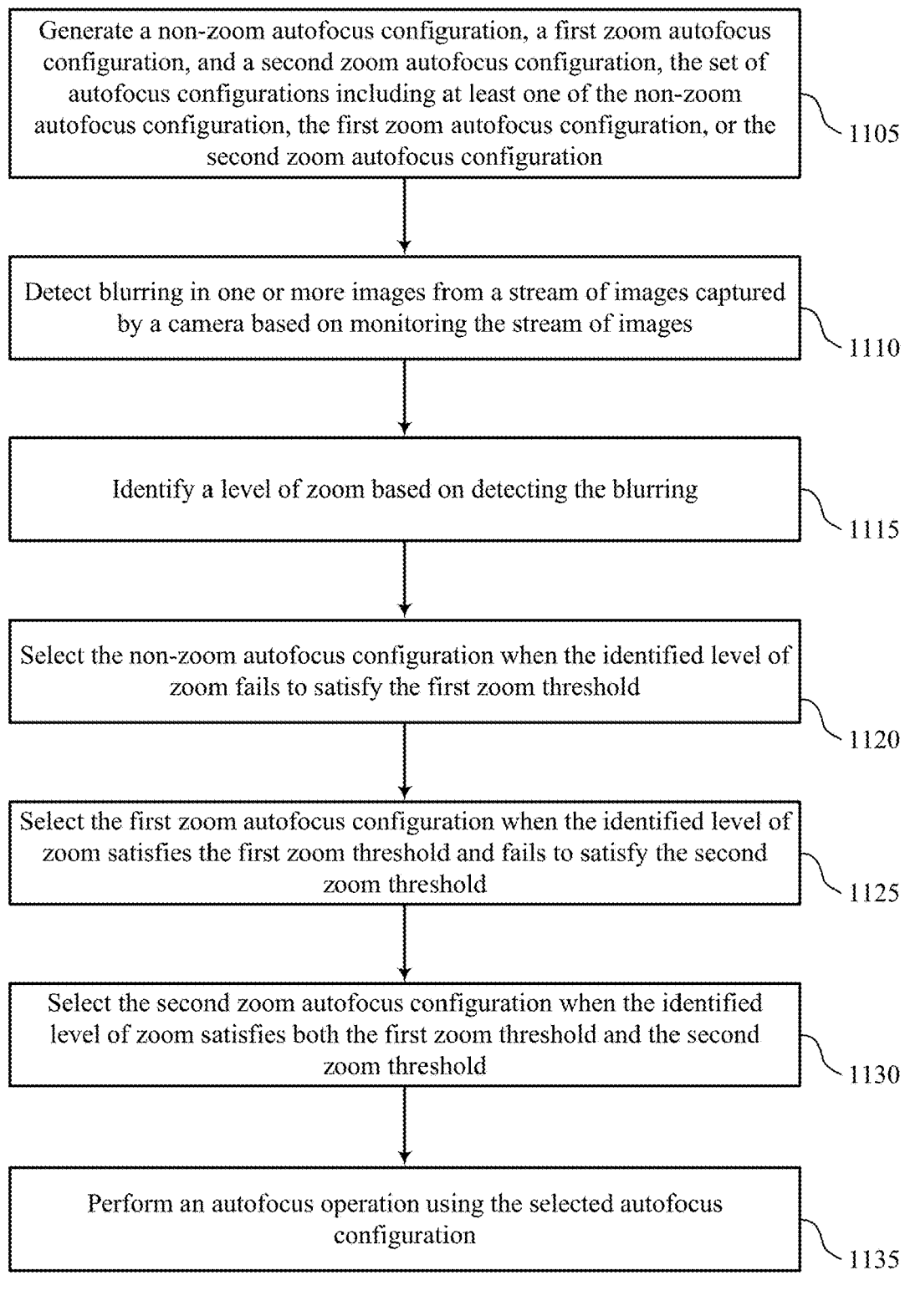

FIG. 11 shows a flowchart illustrating a method 1100 that supports image stabilization in zoom mode in accordance with aspects of the present disclosure. The operations of method 1100 may be implemented by a device or its components as described herein. For example, the operations of method 1100 may be performed by an auto focus manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1105, the device may generate a non-zoom autofocus configuration, a first zoom autofocus configuration, and a second zoom autofocus configuration, the set of autofocus configurations including at least one of the non-zoom autofocus configuration, the first zoom autofocus configuration, or the second zoom autofocus configuration. In some cases, the device selecting the autofocus configuration may include selecting one of the set of autofocus configurations based on the identified level of zoom satisfying a first zoom threshold, or a second zoom threshold greater than the first zoon threshold, or based on satisfying both thresholds or based on satisfying neither threshold. The operations of 1105 may be performed according to the methods described herein. In some examples, aspects of the operations of 1105 may be performed by a configuration manager as described with reference to FIGS. 6 through 9.

At 1110, the device may detect blurring in one or more images from a stream of images captured by a camera based on monitoring the stream of images. The operations of 1110 may be performed according to the methods described herein. In some examples, aspects of the operations of 1110 may be performed by a blur detection manager as described with reference to FIGS. 6 through 9.

At 1115, the device may identify a level of zoom based on detecting the blurring. The operations of 1115 may be performed according to the methods described herein. In some examples, aspects of the operations of 1115 may be performed by a zoom manager as described with reference to FIGS. 6 through 9.

At 1120, the device may select the non-zoom autofocus configuration when the identified level of zoom fails to satisfy the first zoom threshold. In some cases, the device may select the non-zoom autofocus configuration when the identified level of zoom fails to satisfy both the first zoom threshold and the second zoom threshold. The operations of 1120 may be performed according to the methods described herein. In some examples, aspects of the operations of 1120 may be performed by a selection manager as described with reference to FIGS. 6 through 9.

At 1125, the device may select the first zoom autofocus configuration when the identified level of zoom satisfies the first zoom threshold and fails to satisfy the second zoom threshold. The operations of 1125 may be performed according to the methods described herein. In some examples, aspects of the operations of 1125 may be performed by a selection manager as described with reference to FIGS. 6 through 9.

At 1130, the device may select the second zoom autofocus configuration when the identified level of zoom satisfies both the first zoom threshold and the second zoom threshold. The operations of 1130 may be performed according to the methods described herein. In some examples, aspects of the operations of 1130 may be performed by a selection manager as described with reference to FIGS. 6 through 9.

At 1135, the device may perform an autofocus operation using the selected autofocus configuration. The operations of 1135 may be performed according to the methods described herein. In some examples, aspects of the operations of 1135 may be performed by a performance manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a device, comprising:
   generating a non-zoom autofocus configuration, a first zoom autofocus configuration, and a second zoom autofocus configuration;
   detecting blurring in one or more images from a stream of images captured by a camera based at least in part on monitoring the stream of images;
   identifying a level of zoom based at least in part on detecting the blurring;
   selecting an autofocus configuration from a plurality of autofocus configurations based at least in part on the identified level of zoom satisfying a first zoom threshold, or a second zoom threshold greater than the first zoom threshold, or both, the plurality of autofocus configurations including at least one of the non-zoom autofocus configuration, the first zoom autofocus configuration, or the second zoom autofocus configuration; and
   performing an autofocus operation using the selected autofocus configuration.

2. The method of claim 1, wherein selecting the autofocus configuration further comprises: selecting the non-zoom autofocus configuration when the identified level of zoom fails to satisfy the first zoom threshold.

3. The method of claim 1, wherein selecting the autofocus configuration further comprises: selecting the first zoom autofocus configuration when the identified level of zoom satisfies the first zoom threshold and fails to satisfy the second zoom threshold.

4. The method of claim 1, wherein selecting the autofocus configuration further comprises: selecting the second zoom autofocus configuration when the identified level of zoom satisfies both the first zoom threshold and the second zoom threshold.

5. The method of claim 1, wherein performing the autofocus operation includes:
   determining whether a detectable shaking of the camera satisfies a jitter threshold.

6. The method of claim 5, further comprising:
   compensating for jitter by adjusting a position of one or more components of the camera at a rate of movement determined by the selected autoconfiguration when the detectable shaking exceeds the jitter threshold.

7. The method of claim 1, wherein performing the autofocus operation comprises:
   mechanically adjusting one or more autofocus motors.

8. The method of claim 7, wherein mechanically adjusting the one or more autofocus motors includes:
   adjusting at least one lens motor, or at least one image sensor motor, or both.

9. The method of claim 7, further comprising:
   tuning the one or more autofocus motors based at least in part on determining a rate of movement by the one or more autofocus motors relative to incremented levels of zoom varying from no zoom to maximum zoom.

10. The method of claim 1, wherein identifying the level of zoom further comprises:
    identifying the level of zoom by a percentage value, wherein the percentage value at 100% indicates a maximum level of zoom and the percentage value at 0% indicates a minimum level of zoom.

11. An apparatus for image processing at a device, comprising:
    a processor, memory in electronic communication with the processor; and instructions stored in the memory and executable by the processor to cause the apparatus to:

generate a non-zoom autofocus configuration, a first zoom autofocus configuration, and a second zoom autofocus configuration;

detect blurring in one or more images from a stream of images captured by a camera based at least in part on monitoring the stream of images;

identify a level of zoom based at least in part on detecting the blurring;

select an autofocus configuration from a plurality of autofocus configurations based at least in part on the identified level of zoom satisfying a first zoom threshold, or a second zoom threshold greater than the first zoom threshold, or both, the plurality of autofocus configurations including at least one of the non-zoom autofocus configuration, the first zoom autofocus configuration, or the second zoom autofocus configuration; and perform an autofocus operation using the selected autofocus configuration.

12. The method of claim 11, wherein the instructions to select the autofocus configuration further are executable by the processor to cause the apparatus to: select the non-zoom autofocus configuration when the identified level of zoom fails to satisfy the first zoom threshold.

13. The method of claim 11, wherein the instructions to select the autofocus configuration further are executable by the processor to cause the apparatus to: select the first zoom autofocus configuration when the identified level of zoom satisfies the first zoom threshold and fails to satisfy the second zoom threshold.

14. The method of claim 11, wherein the instructions to select the autofocus configuration further are executable by the processor to cause the apparatus to: select the second zoom autofocus configuration when the identified level of zoom satisfies both the first zoom threshold and the second zoom threshold.

15. The apparatus of claim 11, wherein performing the autofocus operation includes determining whether a detectable shaking of the camera satisfies a jitter threshold.

16. The apparatus of claim 15, wherein the instructions are further executable by the processor to cause the apparatus to:

compensate for jitter by adjusting a position of one or more components of the camera at a rate of movement determined by the selected autoconfiguration when the detectable shaking exceeds the jitter threshold.

17. A non-transitory computer-readable medium storing code for image processing at a device, the code comprising instructions executable by a processor to:

generate a non-zoom autofocus configuration, a first zoom autofocus configuration, and a second zoom autofocus configuration;

detect blurring in one or more images from a stream of images captured by a camera based at least in part on monitoring the stream of images;

identify a level of zoom based at least in part on detecting the blurring;

select an autofocus configuration from a plurality of autofocus configurations based at least in part on the identified level of zoom satisfying a first zoom threshold, or a second zoom threshold greater than the first zoom threshold, or both, the plurality of autofocus configurations including at least one of the non-zoom autofocus configuration, the first zoom autofocus configuration, or the second zoom autofocus configuration; and perform an autofocus operation using the selected autofocus configuration.

\* \* \* \* \*